United States Patent
Zhang et al.

(10) Patent No.: US 12,236,691 B2
(45) Date of Patent: Feb. 25, 2025

(54) METHOD, APPARATUS, AND SYSTEM FOR ESTIMATING A LANE WIDTH

(71) Applicant: HERE Global B.V., Eindhoven (NL)

(72) Inventors: Zhenhua Zhang, Chicago, IL (US); Qi Mao, Arlington, TX (US); Xiaoying Jin, Boulder, CO (US); Lin Gan, Chicago, IL (US); Sanjay Kumar Boddhu, Aurora, IL (US)

(73) Assignee: HERE GLOBAL B.V., Eindhoven (NL)

( * ) Notice: Subject to any disclaimer, the term of this patent is extended or adjusted under 35 U.S.C. 154(b) by 410 days.

(21) Appl. No.: 17/698,721

(22) Filed: Mar. 18, 2022

(65) Prior Publication Data

US 2023/0298362 A1 Sep. 21, 2023

(51) Int. Cl.
*G06V 20/56* (2022.01)
*G06T 7/60* (2017.01)

(52) U.S. Cl.
CPC ............ *G06V 20/588* (2022.01); *G06T 7/60* (2013.01); *G06T 2207/30256* (2013.01)

(58) Field of Classification Search
CPC ........... G06T 2207/10032; G06T 2207/30236; G06T 2207/30256; G06T 7/12; G06T 7/181; G06T 7/60; G06T 7/62; G06V 10/762; G06V 20/588
See application file for complete search history.

(56) References Cited

U.S. PATENT DOCUMENTS

| 10,521,676 B2 | 12/2019 | Lee |
| 2012/0069185 A1* | 3/2012 | Stein .................... G06T 7/74 348/148 |
| 2012/0123613 A1* | 5/2012 | Waki .................... G08G 1/166 701/1 |

(Continued)

FOREIGN PATENT DOCUMENTS

| CN | 103383733 B | 11/2013 |
| CN | 106503678 A | 3/2017 |

OTHER PUBLICATIONS

A. López et al., "Robust Lane Markings Detection and Road Geometry Computation," Jun. 29, 2009, International Journal of Automotive Technology, vol. 11, No. 3, pp. 395-404.*

(Continued)

*Primary Examiner* — Omar S Ismail

(57) ABSTRACT

An approach is provided for lane width estimation from incomplete lane marking detections of a road lane. The approach, for example, involves generating one or more perpendicular lines respectively from location centers of one or more first lane marking detections. A respective lane marking detection represents at least a portion of a boundary of the road lane as a line delimited by two location data points in accordance with detections by at least one sensor device onboard at least one vehicle. The approach also involves identifying second lane marking detections that each respectively intersect one of the one or more perpendicular lines. The approach further involves selecting one or (Continued)

more candidate lane widths based on one or more respective distances from the location centers to the second lane marking detections. The approach further involves determining an estimated lane width of the road lane based on the one or more candidate lane widths.

17 Claims, 16 Drawing Sheets

(56) References Cited

U.S. PATENT DOCUMENTS

| | | | | |
|---|---|---|---|---|
| 2013/0182957 | A1* | 7/2013 | Wujcicki | G01C 21/3848 382/199 |
| 2016/0036558 | A1* | 2/2016 | Ibrahim | H04W 4/44 455/297 |
| 2016/0049079 | A1* | 2/2016 | Ibrahim | G08G 1/164 340/944 |
| 2017/0116477 | A1* | 4/2017 | Chen | G01C 21/3819 |
| 2018/0045832 | A1* | 2/2018 | Ibrahim | G01C 21/1654 |
| 2018/0150086 | A1* | 5/2018 | Nobukawa | G08G 1/164 |
| 2018/0257660 | A1* | 9/2018 | Ibrahim | G01S 5/0027 |
| 2020/0160069 | A1* | 5/2020 | Sathyanarayana | G06V 20/588 |

OTHER PUBLICATIONS

Abdel hamid Mammeri et al., "A real-time lane marking localization, tracking and communication system," Aug. 20, 2015, Computer Communications 73(2016),pp. 132-142.*

Danilo C'aceres Hern'andez et al., "Robust Lane Marking Detection Based on Multi-Feature Fusion," Aug. 4, 2016,2016 9th International Conference on Human System Interactions (HSI),pp. 423-427.*

Jaehoon Jung et al., "Efficient and robust lane marking extraction from mobile lidar point clouds," Nov. 15, 2018, ISPRS Journal of Photogrammetry and Remote Sensing 147 (2019),pp. 1-15.*

Feng, Zhaofei, "Lane and Road Marking Detection with a High Resolution Automotive Radar for Automated Driving," Jul. 30, 2019, Zur Erlangung des akademischen Grades eines,pp. 102-122.*

Ayman Habib et al. , "LiDAR-Based Mobile Mapping System for Lane Width Estimation in Work Zones," 2018, Joint Transportation Research Program Publication No. FHWA/IN/JTRP-2018/10). West Lafayette, IN: Purdue University. https://doi.org/10.5703/1288284316730,pp. 19-24.*

Hernadez et al., abstract of "Robust lane marking detection based on multi-feature fusion", Jul. 2016, 6 pages.

* cited by examiner

METHOD, APPARATUS, AND SYSTEM FOR ESTIMATING A LANE WIDTH

BACKGROUND

Navigation and mapping service providers are continually challenged to provide users up-to-date digital map data. One particular area of interest is the use of computer vision to enable mapping and sensing of road networks in an environment (e.g., to support autonomous or semi-autonomous operation or other location-based applications). For example, application of vision techniques includes lane marking localization and lane width estimation. Lane widths vary by road level and road geometry, and regulate vehicle lateral offsets when running on a road. Lane width is especially crucial for autonomous driving applications. However, lane marking detections of a road can be scattered and/or incomplete, subject to error (e.g., positioning or heading error), etc. As a result, service providers face significant technical challenges to estimate a lane width from scattered and/or incomplete lane marking detections.

SOME EXAMPLE EMBODIMENTS

Therefore, there is a need for providing effective and accurate estimation of a lane width from scattered and/or incomplete lane marking detections.

According to example embodiment(s), a method comprises generating one or more perpendicular lines respectively from location centers of one or more first lane marking detections. A respective lane marking detection represents at least a portion of a boundary of the road lane as a line delimited by two location data points in accordance with one or more detections by at least one sensor device onboard at least one vehicle. The method also comprises identifying one or more second lane marking detections that each respectively intersect one of the one or more perpendicular lines. The method further comprises selecting one or more candidate lane widths based on one or more respective distances from the location centers to the one or more second lane marking detections. The method further comprises determining an estimated lane width of the road lane based on the one or more candidate lane widths.

According to another embodiment, an apparatus comprises at least one processor, and at least one memory including computer program code for one or more computer programs, the at least one memory and the computer program code configured to, with the at least one processor, cause, at least in part, the apparatus to generate one or more perpendicular lines respectively from location centers of one or more first lane marking detections. A respective lane marking detection represents at least a portion of a boundary of the road lane as a line delimited by two location data points in accordance with one or more detections by at least one sensor device onboard at least one vehicle. The apparatus is also caused to identify one or more second lane marking detections that each respectively intersect one of the one or more perpendicular lines. The apparatus is further caused to select one or more candidate lane widths based on one or more respective distances from the location centers to the one or more second lane marking detections. The apparatus is further caused to determine an estimated lane width of the road lane based on the one or more candidate lane widths.

According to another embodiment, a computer-readable storage medium carries one or more sequences of one or more instructions which, when executed by one or more processors, cause, at least in part, an apparatus to generate one or more perpendicular lines respectively from location centers of one or more first lane marking detections. A respective lane marking detection represents at least a portion of a boundary of the road lane as a line delimited by two location data points in accordance with one or more detections by at least one sensor device onboard at least one vehicle. The apparatus is also caused to identify one or more second lane marking detections that each respectively intersect one of the one or more perpendicular lines. The apparatus is further caused to select one or more candidate lane widths based on one or more respective distances from the location centers to the one or more second lane marking detections. The apparatus is further caused to determine an estimated lane width of the road lane based on the one or more candidate lane widths.

In addition, for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for generating one or more perpendicular lines respectively from location centers of one or more first lane marking detections. A respective lane marking detection represents at least a portion of a boundary of the road lane as a line delimited by two location data points in accordance with one or more detections by at least one sensor device onboard at least one vehicle. The apparatus also comprises means for identifying one or more second lane marking detections that each respectively intersect one of the one or more perpendicular lines. The apparatus further comprises means for selecting one or more candidate lane widths based on one or more respective distances from the location centers to the one or more second lane marking detections. The apparatus further comprises means for determining an estimated lane width of the road lane based on the one or more candidate lane widths.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for lane width estimation from incomplete lane marking detections of a road lane are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
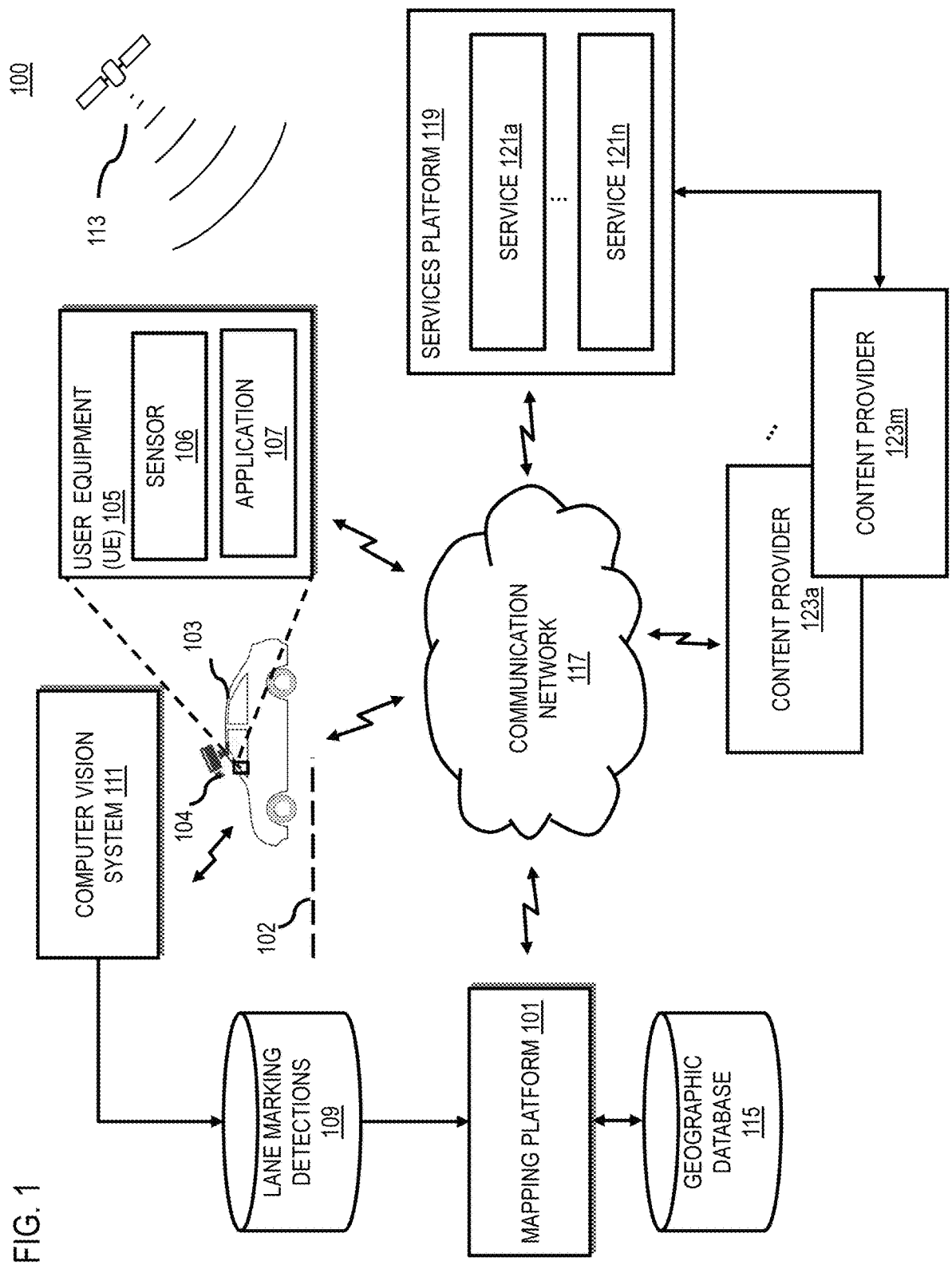
FIG. 1 is a diagram of a system capable of lane width estimation from incomplete lane marking detections of a road lane, according to example embodiment(s)

FIG. 1 is a diagram of a system 100 capable of lane width estimation from incomplete lane marking detections of a road lane, according to example embodiment(s). Mapping and navigation service providers (e.g., operators of a mapping platform 101) face significant technical challenges with respect to generating accurate maps of cartographic features that can be used to facilitate applications such as, but not limited, autonomous driving, lane-level localization, lane-level navigation routing, and/or the like. One class of cartographic features that is of interest for such applications includes lane markings 102 and lane width of a road. This is because lane markings often define lane widths and/or boundaries of a road. Thus, by mapping such lane markings and determining the lane widths, mapping and navigation service providers enable vehicles 103 (e.g., autonomous, semi-autonomous, and/or manually operated vehicles) to have situational awareness of their locations relative to these lane markings (e.g., to detect when they are driving within the boundaries or lanes of a road or segment thereof).

It is contemplated that any type of lane marking associated with a road link segment can be used according to the various embodiments described herein. As shown in FIG. 1, a vehicle 103 is traveling on a road segment and capturing imagery that depicts lane markings 102. By way of example, a lane marking may be located on pavements that corresponds to or otherwise indicates a border of the road link segment (and/or a border of a lane of the link segment), road curbs, road medians, road barriers, and/or the like, such as white lines, yellow lines, edge lines, arrows, HOV symbols, etc. In other examples, a lane marking can be road furniture (e.g., an object whose dimensions can be represented as a line segment or polyline) occurring on or within a threshold proximity of the road. For example, the road furniture can include, but is not limited to, fences, overhead power lines, linearly arranged lights, and/or the like.

In various example embodiments, vehicles 103 (e.g., equipped with vehicle sensors 104, such as camera), user equipment (UE) devices 105 (e.g., equipped with sensors 106, such as camera, and/or executing respective applications 107 for generating and reporting lane marking detections 109 from sensor data/image data), and/or any other devices capable of traveling over a road network can be used to collect lane marking detections 109 for lane width estimation from incomplete lane marking detections of a road lane. In one embodiment, the sensors 104/106 can directly scan for lane marking detections 109 (e.g., based on reflectivity using Light Detection and Ranging (LiDAR)) when travelling on the road link segment where the vehicle path is described by a sequence of two or more location data points determined using a positioning sensor of the vehicle 103 or other mobile device(s).

In another embodiment, a computer vision system 111 (e.g., system comprising cameras and object recognition systems or equivalent) or equivalent on-board cameras of vehicles 103 and/or UEs 105 can detect lane markings by detecting the edges of the lane markings in image(s). The computer vision system 111, for instance, can employ a neural network (e.g., a convolutional neural network) or equivalent to recognize and determine feature data points corresponding to the lane marking. The imagery is captured by a camera system of a vehicle 103 and/or UE 105 as raster images at a predetermined pixel resolution. In one example embodiment, the imagery can be captured using cameras sensitive to visible light, infra-red, and/or any other wavelength of light. To support real-time operation, the imagery can be part of an image stream captured at a relatively high frequency (e.g., 20 Hz, 30 Hz, or higher).

Each image or frame of the image stream can then be processed to provide detection of lane markings (e.g., in real-time or as a batch process). To detect a lane marking, the computer vision system 111 uses object recognition image processing to identify pixels of the image corresponding to surfaces or other visual features of the lane marking (e.g., painted surfaces for lane markings or road boundaries, structures associated with medians/curbs/sidewalks/etc., and/or the like). The detected positions of the selected feature points of (GPS) position) of the vehicle 103 or UE 105 traveling the road segment. The output of the detection process is one or more sets of line segments delimited by detected feature points of the lane marking. In some cases, as described above and depending on detection quality, the resulting lane marking detections may comprise a continuous or discontinuous set of line segments that represent the detected lane marking.

The lane markings define the bounds of drive lanes and are useful components in the lane-based autonomous driving or other equivalent location-based applications. Various example embodiments are provided for determining, from vehicle sensor data (e.g., image data, GPS locations), the plurality of lane marking detections 109 associated with a road link segment. For instance, the lane marking detections may correspond to sensor observations (e.g., image data) that are indicative of a lane marking. In one example embodiment, a lane marking detection can represent a lane marking (or portion thereof) as a line segment delimited by two feature points (e.g., end points of the line segment) corresponding to points on the lane marking detected from the image data (or other equivalent sensor data).

The accuracy of the lane width estimation is heavily dependent on the quality of lane marking detections. However, the lane marking detections are usually in low quality, such as orientation inaccuracy, location inaccuracy, duplicate lane marking detections, low coverage, etc., due to partial occlusion, equipment malfunction, bad sunlight, etc.

Figure 2A:
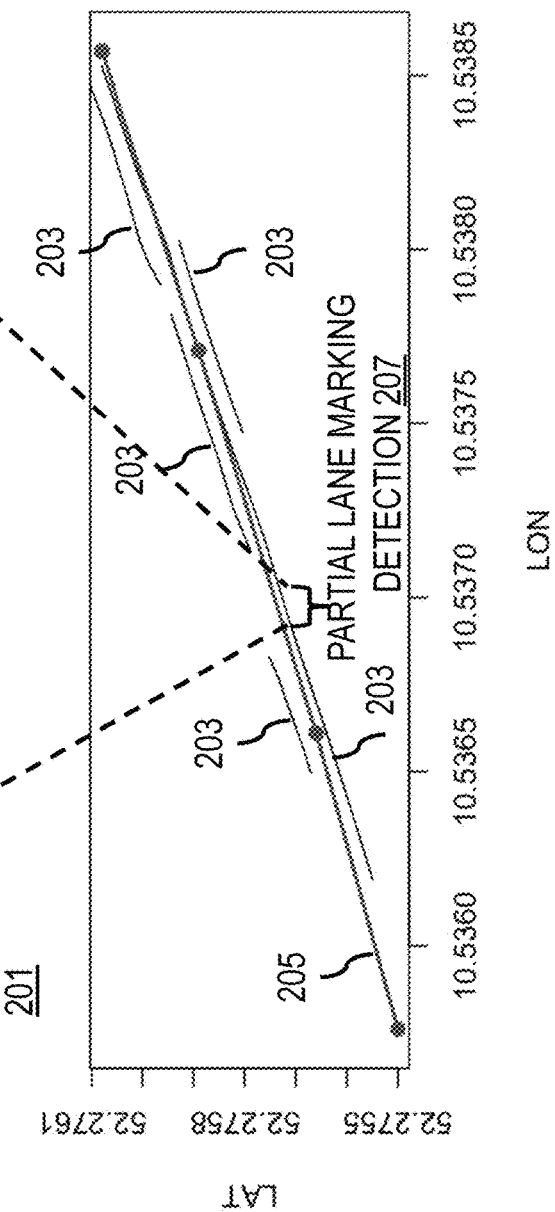
FIG. 2A are diagrams illustrating an example of scattered and/or incomplete lane marking detections of a road, according to example embodiment(s)

FIG. 2A are diagrams illustrating an example of scattered and/or incomplete lane marking detections of a road, according to example embodiment(s). It is noted that the example lane marking detections depicted in FIG. 2A are provided by way of illustration and not as limitations. In an example diagram 201 at the bottom of FIG. 2A, lane marking detections 203 that represent various lane markings on a road link segment 205 (e.g., extracted from a map or a geographic database) with multiple segments are received.

A lane marking detection can be constituted by at least one set of two or more feature points (e.g., location data points such as GPS points or equivalent) such that each set of two feature points represent a segment of the linear feature as a line. Multiple sets of the feature points can then form a polyline representation of the lane marking detection. A location of a feature point, for instance, refers to a set of geocoordinates (e.g., latitude, longitude, and altitude) indicating a point location (e.g., a beginning, end, or other detected point of a line or lane marking). Each set of two or more feature points describes a line segment along a corresponding lane marking. The lane marking detection can include location data points that are ordered (e.g., the location data points are received with a travel direction) and grouped into at least one set of location data points. Each set respectively represent a separate portion of the lane marking.

For instance, the road link segment 205 has three segments defined by four nodes in the diagram 201. The diagram 201 also depicts several scattered and/or incomplete lane marking detections 203 on the left and right side of the road, based on their respective locations (e.g., longitude on the x axis and latitude on the y axis). By way of example, a partial lane marking detection 207 in the diagram 201 corresponds to a partial road segment in an example image 209 on the top of FIG. 2A that has only a median marking and misses lane markings on left and right sides thereof.

Accordingly, mapping and navigation service providers face significant technical challenges with respect to how to estimate lane width of a road segment based on inaccurate/incomplete lane marking detentions with issues of low coverage, origination/location accuracy, duplicates, etc., thereby supporting safety critical applications such as but not limited to autonomous driving applications that depend on accuracy lane width data.

In one example embodiment, the image 209 captured by vehicle 103 and/or UE 105 can be processed (e.g., via the computer vision system 111 or equivalent feature detector/object recognition system) to generate lane marking detections 203 that are visible in the diagram 201. The lane marking detections 203 are represented as one or more line segments respectively delimited by the detected locations of two feature points on the lane marking. For example, the detected locations are GPS locations or any other equivalent location data points determined using a positioning system associated with the vehicle 103 and/or UE 105 such as but not limited a satellite-based positioning system or equivalent. Similarly, the image 209 can be processed to generate lane marking detections 203 representing lane markings.

Figure 2B:
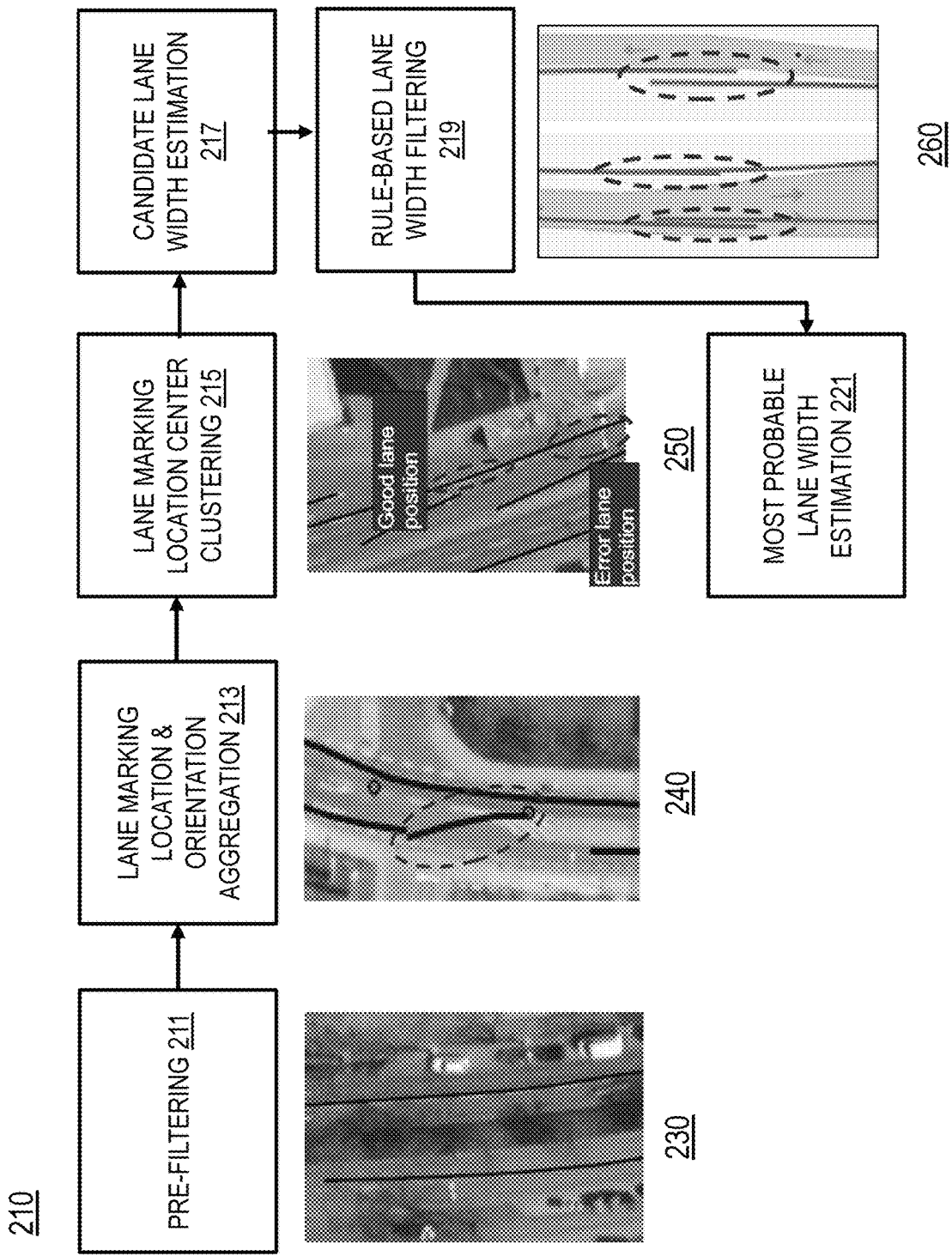
FIG. 2B is a flowchart of a process for lane width estimation from incomplete lane marking detections of a road lane, according to example embodiment(s)

FIG. 2B is a flowchart of a process 210 for lane width estimation from incomplete lane marking detections of a road lane, according to example embodiment(s). In one embodiment the process 210 can include a pre-filter stage 211, a lane marking location and orientation aggregation stage 213, a lane marking location center clustering stage 215, a candidate lane width estimation stage 217, a rule-based lane width filtering stage 219, and a most probable lane width estimation stage 221.

During the pre-filter stage 211, the system 100 can check whether a total length of the lane marking detections falls in a preferred range with respect to a length of a corresponding road link segment. For instance, the system 100 can aggregate a total length of the lane marking detections 203 in FIG. 2A, and determine whether the total length falls in a preferred range, such as within 1.4 times to 3 times of a length of the road link segment 205.

Figure 2C:
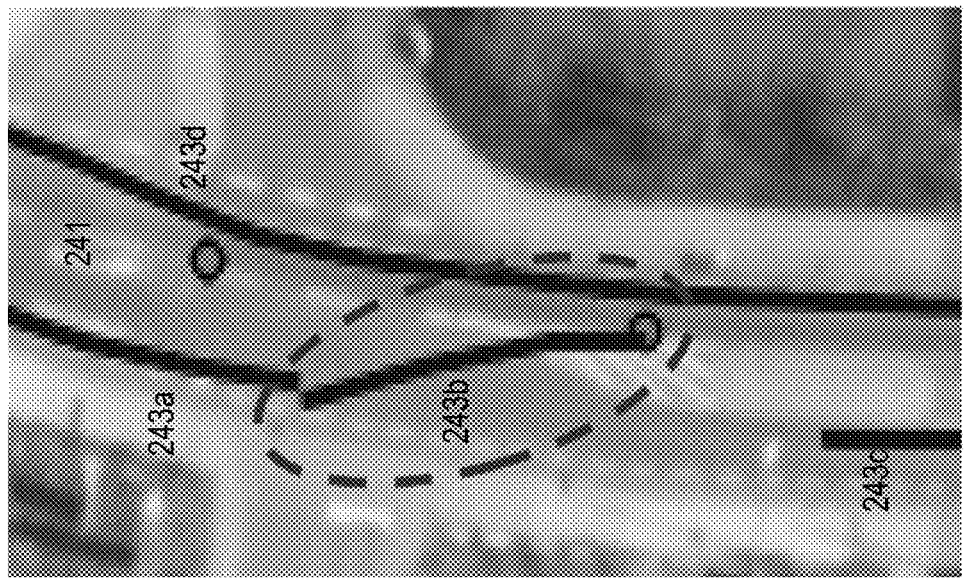
FIGS. 2C-2D are diagrams illustrating examples of scattered and/or incomplete lane marking detections of various roads, according to example embodiment(s)
Figure 2C:
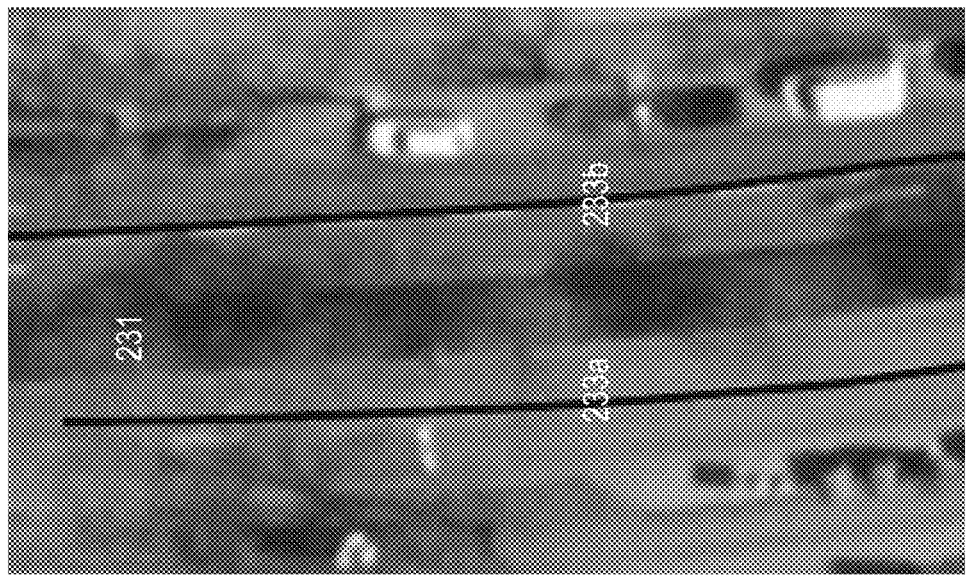

When the total length falls in the preferred range, the system 100 can proceed to Stage 213. When the total length falls outsides of the preferred range, the system 100 can stop the process 210, and/or continue with another set of lane marking detections. For instance, an image 230 in FIG. 2B shows a low coverage example of a set of lane marking detections. When a total length of the lane marking detections falls below 1.4 times of a road link segment length, the set of lane marking detections is insufficient to proceed to Stage 213. The details of Image 230 are depicted in FIG. 2C. Image 230 depicts a road segment 231 with two lanes on each side. However, each of the lane marking detections 233a, 233b barely covers one time of the respective lane markings. On the other hand, when a total length of the lane marking detections goes beyond three times of a road link segment length, the set of lane marking detections may contain too many duplicates to proceed to Stage 213. In either case, the system 100 can stop processing the lane marking detections, and/or continue with another set of lane marking detections.

During the lane marking location and orientation aggregation stage 213, the system 100 can first separate the continuous lane marking detections pre-filtered in Stage 211 into singular lane marking detections and then estimate the most probable lane marking heading per singular lane marking detection. In this case, a single lane marking detection refers to a line formed by two locations. Stage 213 can be employed to counter the effects of the orientation errors in lane width estimation (e.g., in Image 230).

Since the lane marking detections can span across a straight or curved road segment, it can be technically challenging to quantify the location and orientation features over a continuous lane marking detection (e.g., because the orientation can vary over the curved road segment that changes direction). Accordingly, the system 100 separates a continuous lane marking detection into singular lane marking detections to aggregate various in Stage 213.

As mentioned, locations of the lane marking detections can be affected by GPS fluctuations. For instance, a vehicle on-board camera can inherently detect lane marking (due to inaccurate position locations) as incomplete and flawed caused by satellite coverages, imperfections in a map source (e.g., the USGS map), malfunctioning GPS receivers, etc. To obtain a GPS location reading, the number of satellites in view at the time of the reading can affect reading accuracy. For instance, when there are fewer than four satellites in view, the accuracy of the reading can be compromised. For time to time, the GPS receiver can be a clear view of the sky, or obstructed from satellites (e.g., by large buildings, mountains, etc.).

To overcome the issue, the system 100 can separate each of the incomplete and flawed lane marking detections into a set of singular lane marking detections formed by only two location points. To generalize orientation features in such line-based lane marking, the system 100 can aggregate each of the singular lane marking detection into three features: a location center, an orientation, and a lane marking length weight. Such location center and orientation can eliminate the GPS fluctuations in each singular lane marking detection.

Figure 3B:
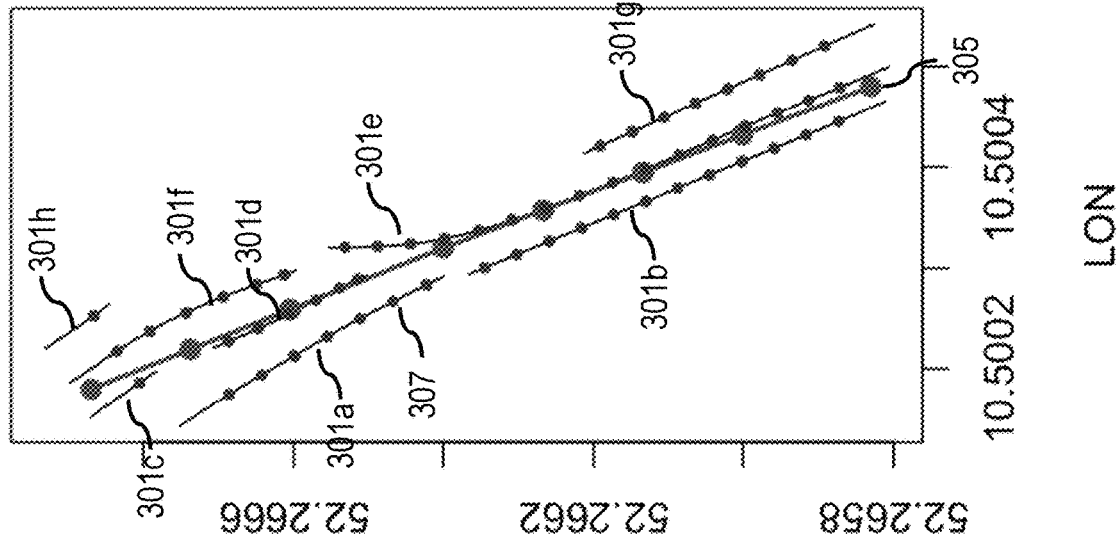
FIGS. 3A-3B are diagrams illustrating an example of scattered and/or incomplete lane marking detections of a road and converted location centers thereof, according to example embodiment(s)
Figure 3A:
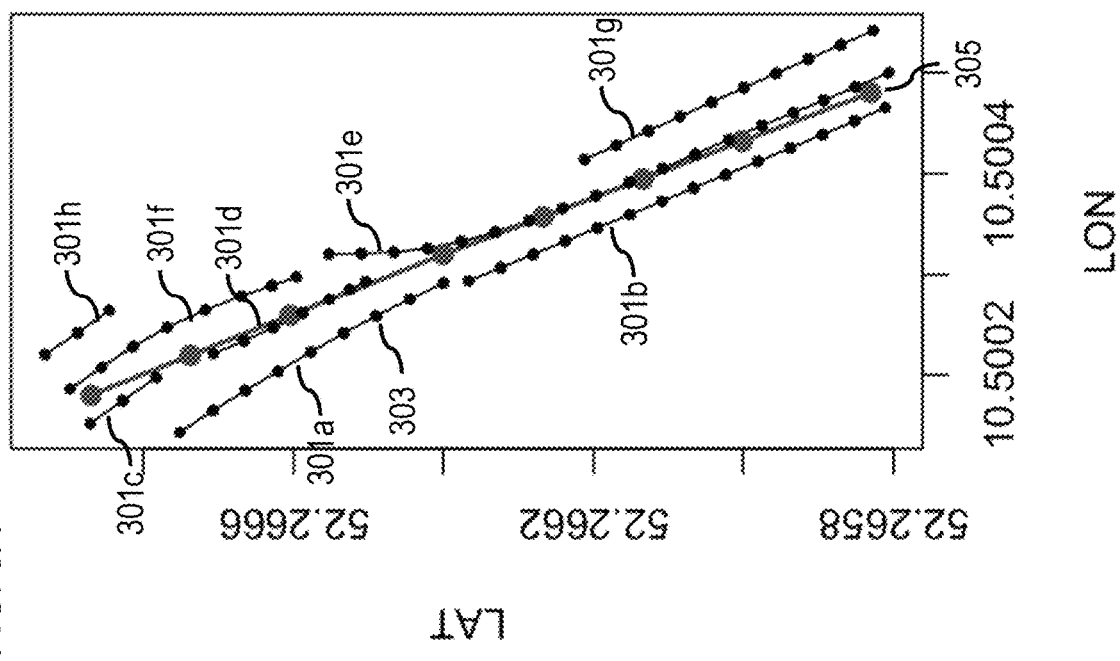

FIGS. 3A-3B are diagrams illustrating an example of scattered and/or incomplete lane marking detections of a road and converted location centers thereof, according to example embodiment(s). For instance, each of the lane marking detections 301a-301h in FIG. 3A (composed by a plurality of location points 303) can be separated into a set of singular lane marking detections/lines each formed by only two location points 303. For instance, the lane marking detection 301a is composed by nine location points 303, and can be separated into eight singular lane marking detections. A road link segment 305 is also depicted in in FIGS. 3A-3B. For each singular lane marking detection/line, the system 100 can determine (1) a center between each pair of location points 303 as a location center 307 in FIG. 3B (e.g., for selecting/qualifying lane marking detections to proceed to the clustering stage 215), (2) an orientation of the pair of location points 303 (e.g., for filtering lane marking detections with inaccurate orientations), and (3) a distance between the pair of location points 303 as a lane marking length weight (e.g., for estimating the lane width in Stage 211).

For instance, an image 240 in FIG. 2B is enlarged in FIG. 2C to show details of an example lane marking detection with an inaccurate orientation with respect to a road segment and/or nearby lane marking detections. Image 240 depicts a road segment 241 with two lanes on each side defined by a center line and two boundaries. However, among four lane marking detections 243a-243d, the lane marking detection 243b has an orientation (composed by the orientations of its singular lane marking detections) different from the orientations of the other three lane marking detections 243a, 243b, 243d. When the differences meet or go beyond a threshold, the system 100 can determine/identify that the lane marking detection 243b has an inaccurate orientation and skip/disqualify it from further processing.

During the lane marking location center clustering stage 215, the system 100 can cluster singular lane marking detections and/or continuous lane marking detections processed in Stage 213 (using K-means, DBSCAN, etc.) into different lane marking rows based on respective lateral distances to a map-matched road link segment. The map-matching can use road link segment records of a geographic database 115 (or equivalent digital map data).

It is contemplated that the map matching can use any map matching algorithm including but not limited to point-based map matching, path-based map matching, and/or the like. In one example embodiment, a lane marking detection is associated with or otherwise detected on road represented by a map road link segment (e.g., stored in the digital map data of the geographic database 115). A "map road link segment" or "road link segment" refers to a map representation of a road or road segment stored as a road link data record of the geographic database 115 or equivalent digital map.

In one embodiment, the system 100 can cluster the singular lane marking detections based on their lateral distances (e.g., signed distances, Euclidean distances, etc.) to a corresponding link segment. A signed distance takes into consideration in which half-space the location points lie. An Euclidean distance is calculated on the basis of a spherical earth (ignoring ellipsoidal effects).

In one embodiment, the system 100 can apply center-location clustering to find location center pairs in different clusters for calculating candidate lane widths in Stage 217.

Figure 4A:
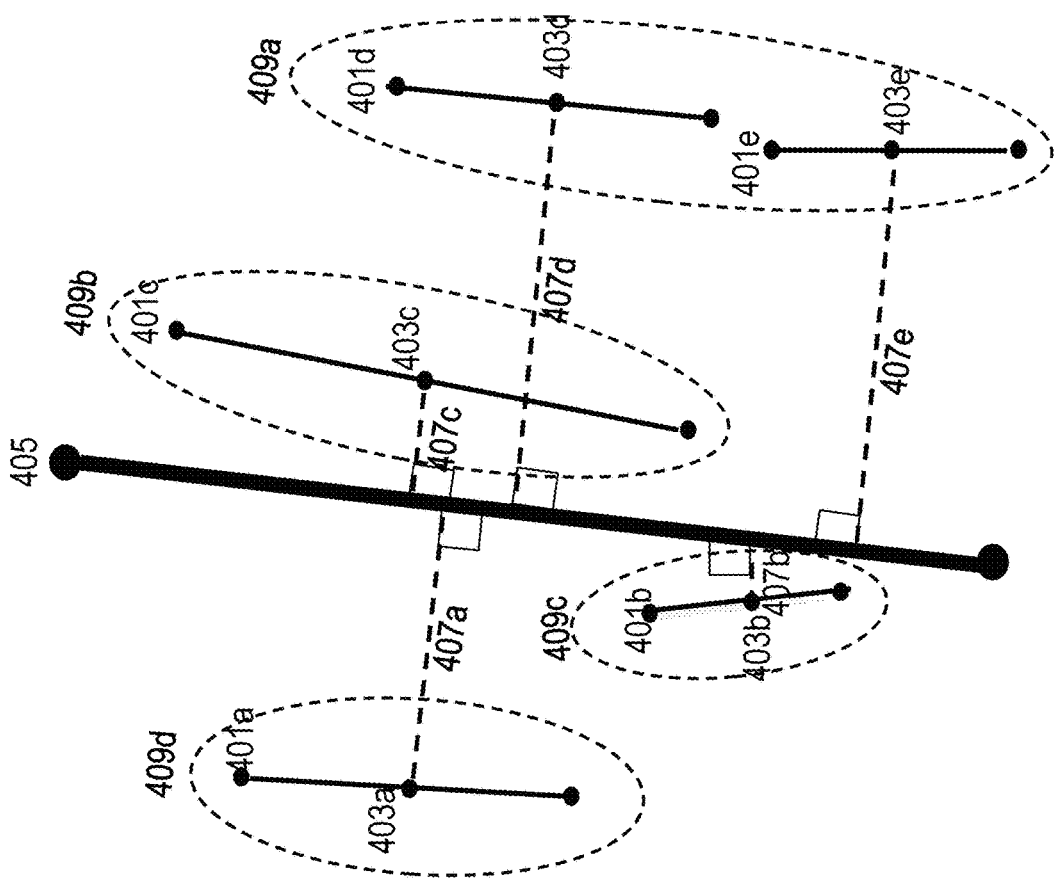
FIG. 4A is a diagram illustrating how to cluster singular lane marking detections, according to example embodiment(s)

FIG. 4A is a diagram illustrating how to cluster singular lane marking detections, according to example embodiment(s). FIG. 4A shows five singular lane marking detections 401a-401e with respective location centers 403a-403e towards a map-matched road link segment 405 with signed distances. The location center pairs (e.g., singular lane marking detections 401d, 401e) with signed distances ranged in −5 meters and −5.1 meters can be put into the same cluster (e.g., a cluster 409a), while location center pairs (e.g., each of singular lane marking detections 401a, 401b, 410c forms their own clusters 409b, 409c, 409d) with signed distances ranged −5 meters and −2 meters can be put into different clusters. The location center pairs in the same cluster from the same lane marking row, and their lateral distances cannot be taken as a viable candidate lane width. The system 100 can calculate candidate lane widths between singular lane marking detections in different lane marking rows in Stage 217.

In another embodiment, referring back to FIG. 3A, the system 100 can cluster the continuous lane marking detections 301a-301h into three lane marking rows: lane marking detections 301a, 301b in a first lane marking row, lane marking detections 301c, 301d, 301e in a second lane marking row, lane marking detections 301f, 301g in a third lane marking row, while lane marking detection 301h in a fourth lane marking row. The system 100 can calculate candidate lane widths between continuous lane marking detections in different lane marking rows in Stage 217.

Figure 2D:
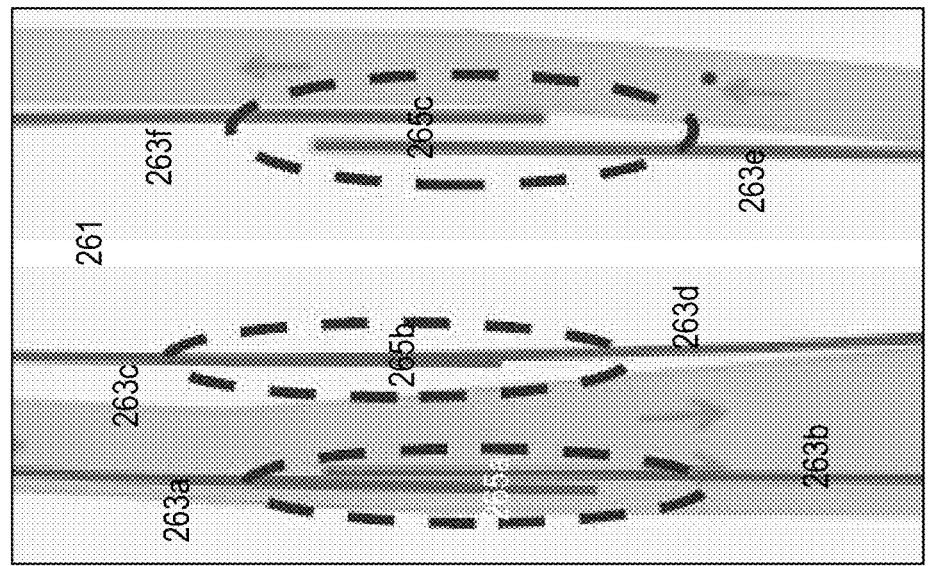
Figure 2D:
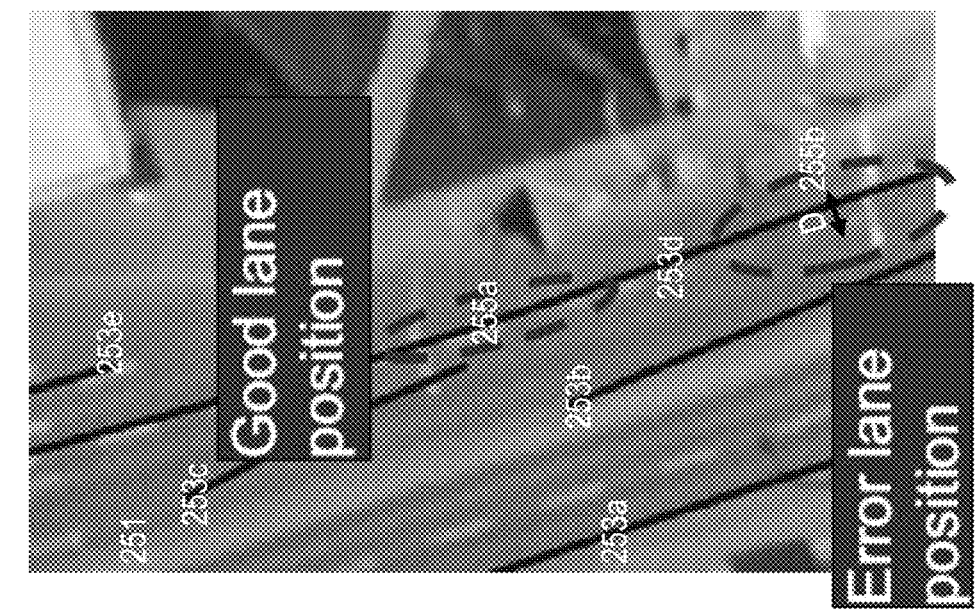

The clustering stage 215 can counter effects of location errors in lane marking detections. For instance, an image 250 in FIG. 2B is enlarged in FIG. 2D to show details of an example singular lane marking detection(s) with location errors with respect to a road segment. Image 250 depicts a road segment 251 with multiple lanes on each side defined by a center line and land markings. Image 250 shows five lane marking detections 253a-253e. For instance, the lane marking detection 253d (composed by its singular lane marking detections) has a group of singular lane marking detections 255a significantly approximate to the road segment 251 (i.e., "good lane position"), and another group of singular lane marking detections 255b away from the road segment 251 with a distance D (i.e., "error lane position" as D exceeds a threshold value). The system 100 can calculate candidate lane widths between singular lane marking detections of "good lane positions" in Stage 217. On the other hand, the system 100 can skip/disqualify singular lane marking detections of "error lane positions" from further processing.

Figure 4B:
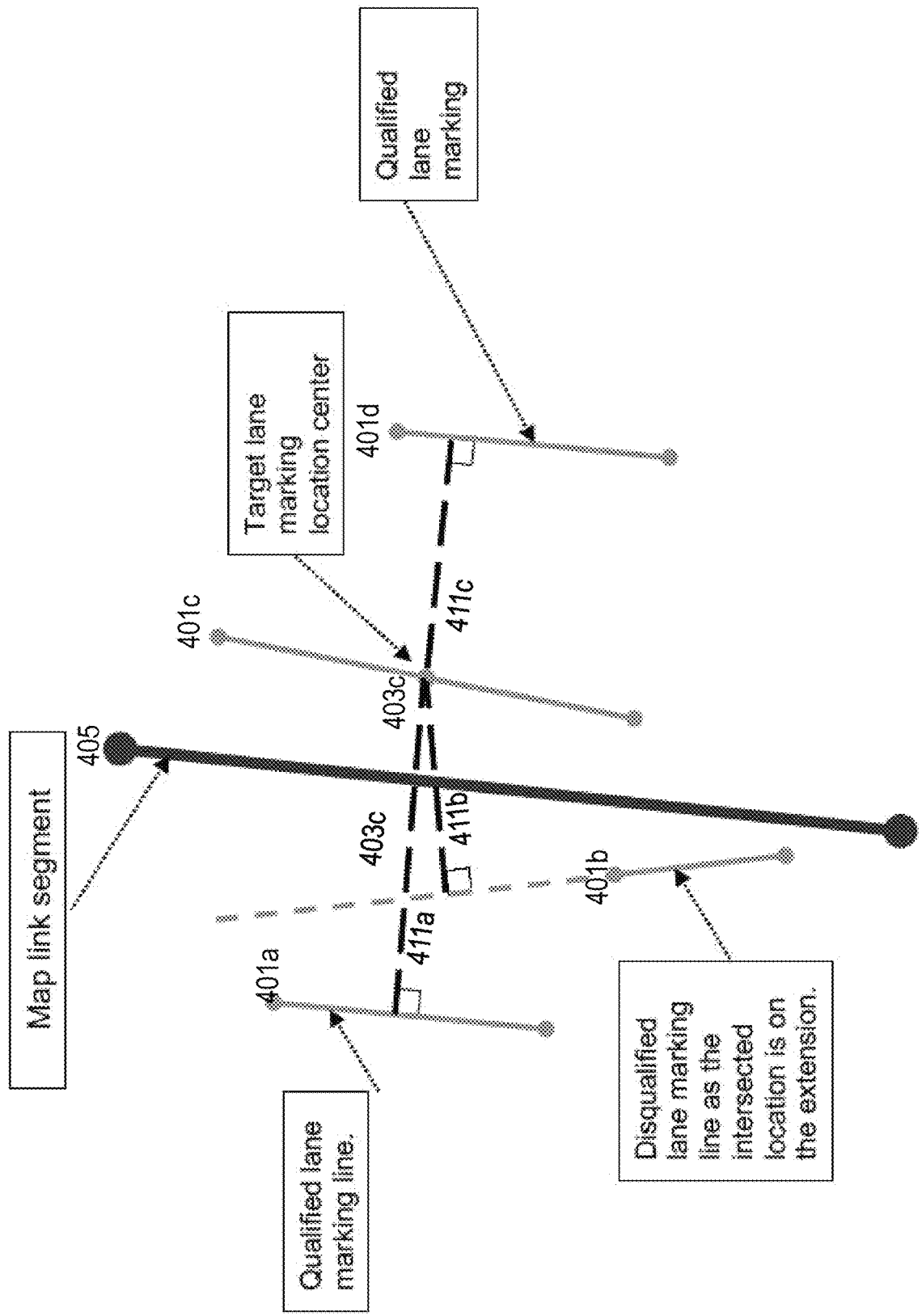
FIG. 4B is a diagram illustrating how to determine one or more candidate lane widths from location centers of singular lane marking detections, according to example embodiment(s)

During the candidate lane width estimation stage 217, the system 100 can deploy the location centers (e.g., the location centers 403) to estimate lateral distances between any two singular lane marking detections 401 that are clustered into different lane marking rows in Stage 215. FIG. 4B is a diagram illustrating how to determine/estimate one or more candidate lane widths from location centers of singular lane marking detections, according to example embodiment(s). For instance, given the lane marking location center 403c of the lane marking detection 401c, perpendicular lines 411a, 411b, 411c can be drawn to its nearby singular lane marking detections/lines 401a, 401b, 401d to identify qualified singular lane marking detections.

For instance, the system 100 can identify lane marking detections 401a, 401d each intersecting one of the perpendicular lines thereby constituting qualified lane marking detections/lines for estimating candidate lane widths. On the other hand, the system 100 can identify lane marking detection 401b not intersecting the perpendicular lines thereby constituting a disqualified lane marking detection/line from estimating candidate lane widths.

The system 100 can generate a candidate lane width for each qualified singular lane marking detection. The length of the perpendicular line from the target lane marking location center (e.g., the lane marking location center 403c) to the intersected location is taken as a candidate lane width shown as in FIG. 4B. Such calculation can be repeated for each singular lane marking detection associated with the road link segment 405 to generate a plurality of candidate lane widths for Stage 219.

During the rule-based lane width filtering stage 219, the system 100 can apply rule(s) to filter the plurality of candidate lane widths generated in Stage 217, remove duplications, and calculate the weight for each filtered candidate lane width. The method aims at filtering the lane width estimation based on lane counts in HERE map and civil construction specification.

Figure 5:
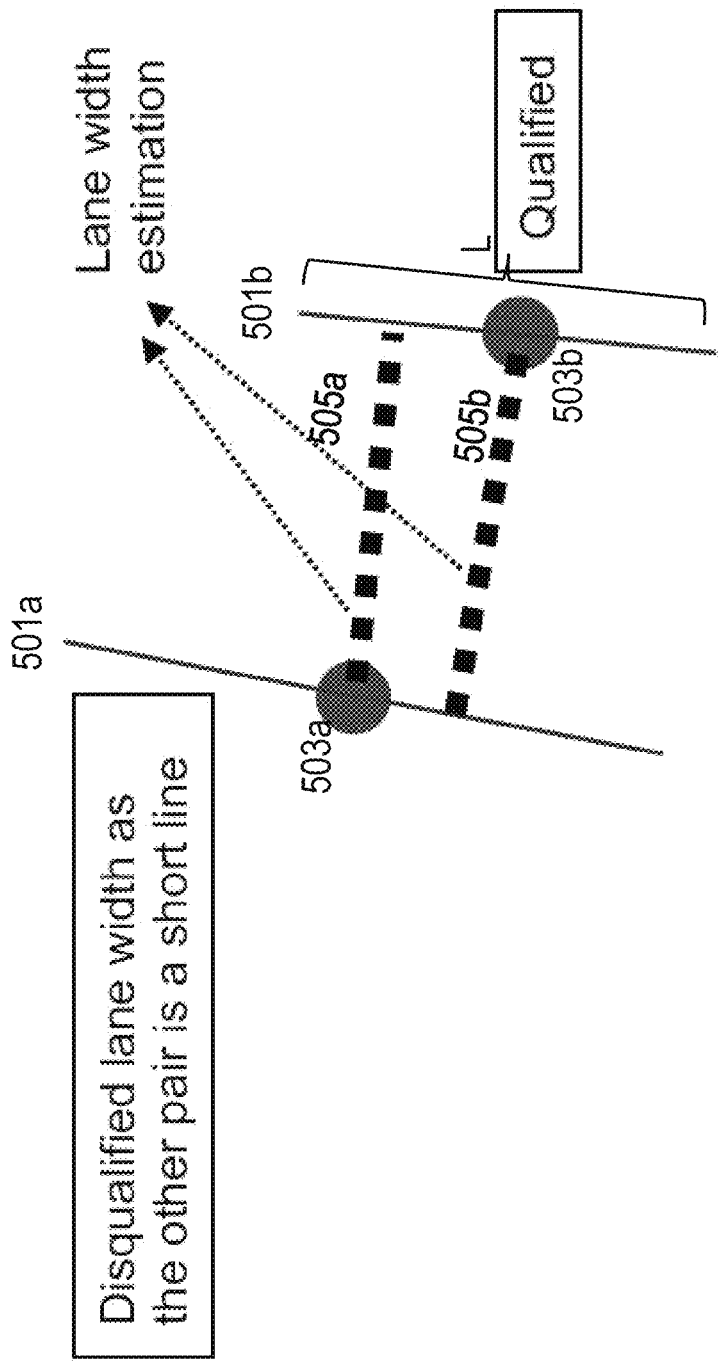
FIG. 5 is a diagram illustrating how to remove duplicate candidate lane widths based on parallel lane marking detections, according to example embodiment(s)

In one embodiment, the system 100 can remove duplicate candidate lane widths based on two parallel singular lane marking detections. FIG. 5 is a diagram illustrating how to remove duplicate candidate lane widths based on parallel lane marking detections, according to example embodiment(s). FIG. 5 shows two parallel singular lane marking detections 501a, 501b with location centers 503a, 503b and duplicate candidate lane widths 505a, 505b. In this case, only one candidate lane width 505b is kept, and the shorter lane marking length L of the singular lane marking detection 501b is assigned as the lane width weight for Stage 521.

Therefore, Stage 219 can counter effects of duplicate lane marking detections and/or candidate lane widths. For instance, an image 260 in FIG. 2B is enlarged in FIG. 2D to show details of example duplicate lane marking detections with respect to a road segment. Image 260 depicts a road segment 261 with multiple lanes on each side defined by a center line and land markings. Image 260 shows six lane marking detections 263a-263f and the duplicates 265a-265c thereof. For instance, the lane marking detections 263c, 263d (each composed by its singular lane marking detections) and each singular lane marking detections of their duplicates 265b can be processed as shown in FIG. 5 to remove candidate lane width duplicates. The system 100 can only keep one candidate lane width associated with a singular lane marking detection with a shorter lane marking length that is assigned as the lane width weight for Stage 521. On the other hand, the system 100 can skip/disqualify the other singular lane marking detection with a shorter lane marking length from further processing.

In another embodiment, the system 100 can filter the candidate lane widths based on lane counts in a map database, civil construction specifications, etc. For instance, The candidate lane widths are further filtered based on road construction specifications, such as O. F. TRANSPORTATION, "Standard Specifications for Construction of Roads and Bridges on Federal Highway Projects." For a multi-lane road, the lane widths should be in q range of e.g., 2.6 m-4.6 m. For a single-lane road, the maximum threshold for lane widths can be increased to a larger value (e.g., 5.5 m) to allow more space for median, local roads with missing lane marking, etc. The system 100 can keep filtered candidate lane widths for Stage 521.

During the most probable lane width estimation stage 521, the system 100 can estimate the most probable lane width based on an average or a median of filtered candidate lane widths of a lane topology or road segment based on the filtered candidate lane widths from Stage 519. In another embodiment, the system can employ a weighted-median method on the filtered candidate lane widths to estimate the most probable lane width of the lane topology or road segment. After the filtering, duplication removal as well as weight estimation, the weighted median or average value of all the candidate lane widths on the same lane topology or road segment can be taken as the most probable lane width for that lane topology or road segment.

Therefore, the system 100 can estimate the most probable lane width for a lane topology or road segment, regardless that the lane marking detections may be affected by partial occlusion, equipment malfunction, reflection, etc. and suffer from issues such as low coverage, detection incompleteness, inaccurate orientation and/or location, duplicate detection, etc.

In one embodiment, the system 100 can use the most probable lane width data to reconstruct the lane markings for the respective road segment. In other embodiments, the most probable lane width data can be widely used in other location-based applications and services. For example, the lane marking representations generated based on the most probable lane width data according to the various example embodiments described herein can be stored in the geographic database 115 for access by one or more other component of the system 100 or any other component with connectivity to the mapping platform 101 and/or geographic database 115. For example, the lane marking representations stored in the geographic database 115 can be accessed over a communication network 117 by the vehicle 103 for autonomous driving applications, lane-level navigation, lane-level positioning, and/or the like. In another example embodiment, a services platform 119, one or more services 121*a*-121*n* (also collectively referred to as services 121), and/or one or more content providers 123*a*-123*m* (also collectively referred to as content providers 123) can access the lane marking representations of the geographic services to perform one or more functions (e.g., location-based functions).

Figure 6:
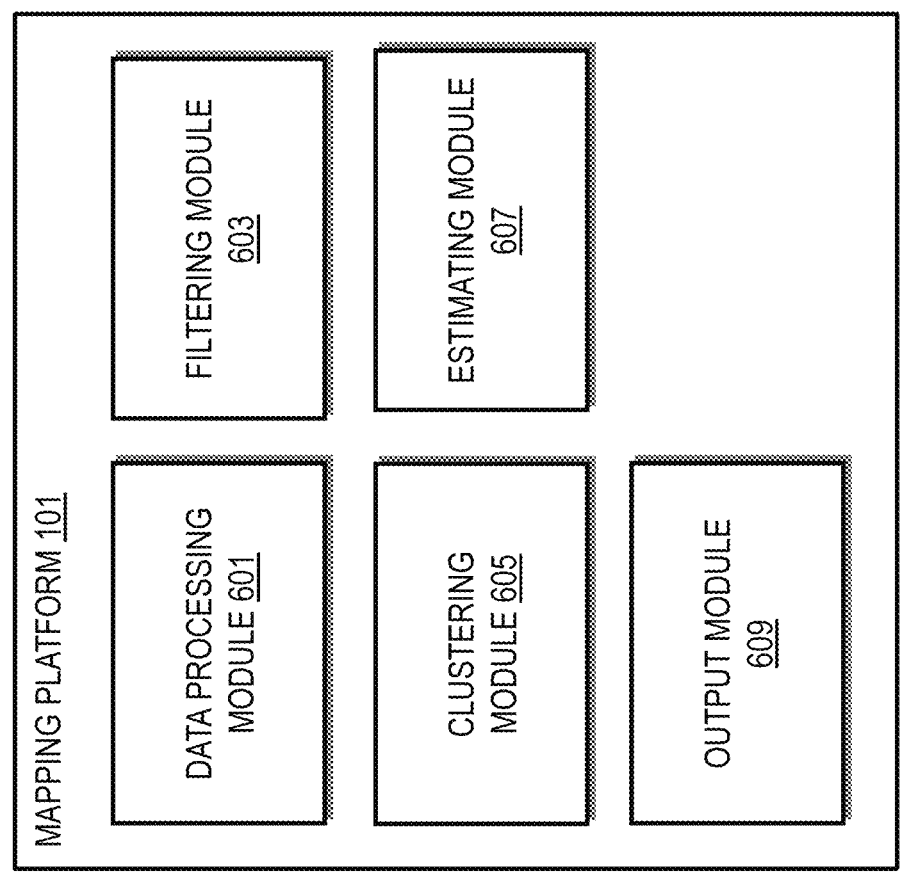
FIG. 6 is a diagram of components of a mapping platform capable of lane width estimation from incomplete lane marking detections of a road lane, according to example embodiment(s)

FIG. 6 is a diagram of components of a mapping platform capable of lane width estimation from incomplete lane marking detections of a road lane, according to example embodiment(s). In one embodiment, as shown in FIG. 6, the mapping platform 101 includes one or more components for reconstructing road lane markings according to the various example embodiments described herein. As shown, in one example embodiment, the mapping platform 101 includes a data processing module 601, a filtering module 603, a clustering module 605, an estimating module 607, and an output module 609. The above presented modules and components of the mapping platform 101 can be implemented in hardware, firmware, software, or a combination thereof. Though depicted as a separate entity in FIG. 1, it is contemplated that the mapping platform 101 may be implemented as a module of any of the components of the system 100 (e.g., a component of the services platform 119, services 121, content providers 123, vehicle 103, UE 105, computer vision system 111, application 107, and/or the like). In another embodiment, one or more of the modules 601-609 may be implemented as a cloud-based service, local service, native application, circuitry, or combination thereof.

As used herein, the term "circuitry" may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

The functions of the mapping platform 101 and modules 601-609 are discussed with respect to the figures discussed below.

Figure 7:
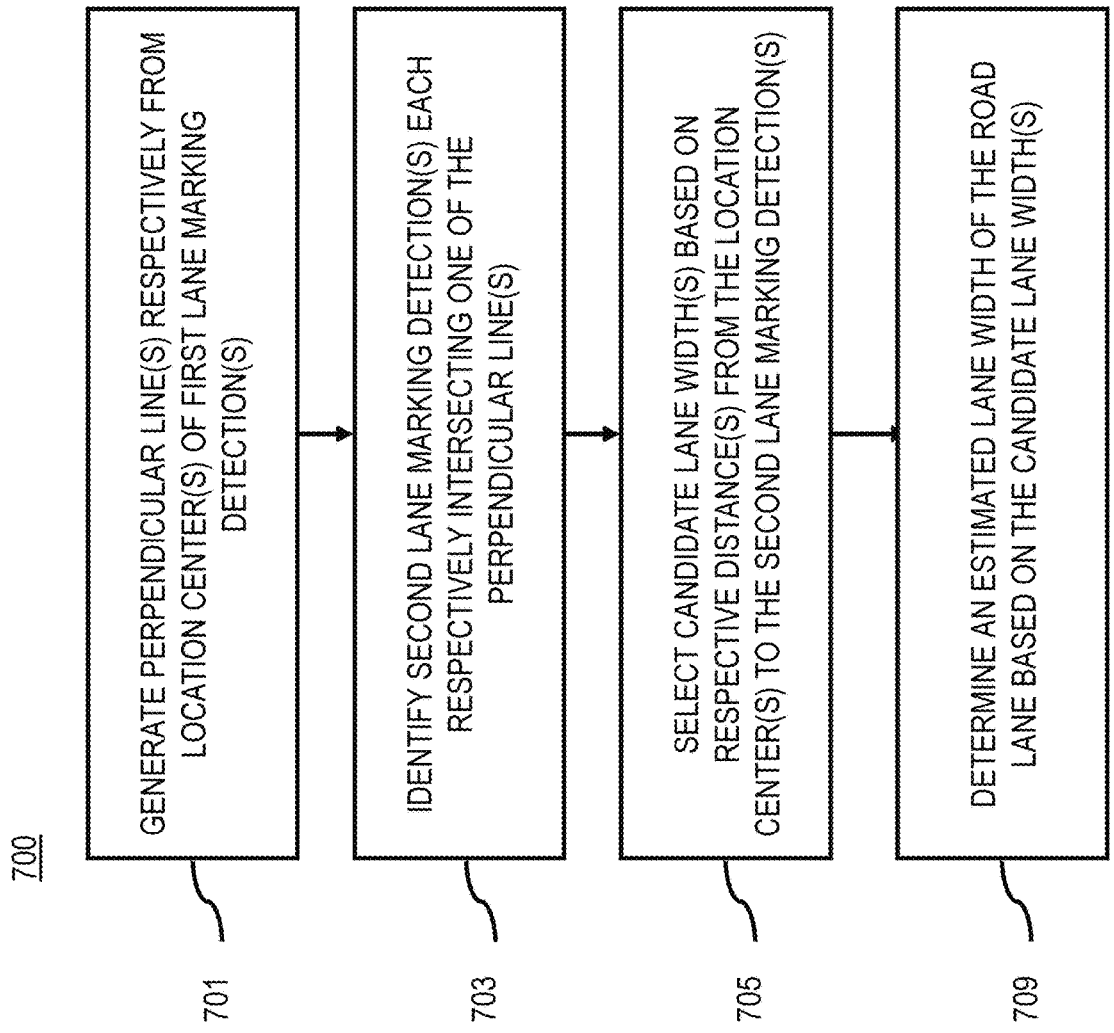
FIG. 7 is a flowchart of a process for lane width estimation from incomplete lane marking detections of a road lane, according to example embodiment(s)
Figure 11:
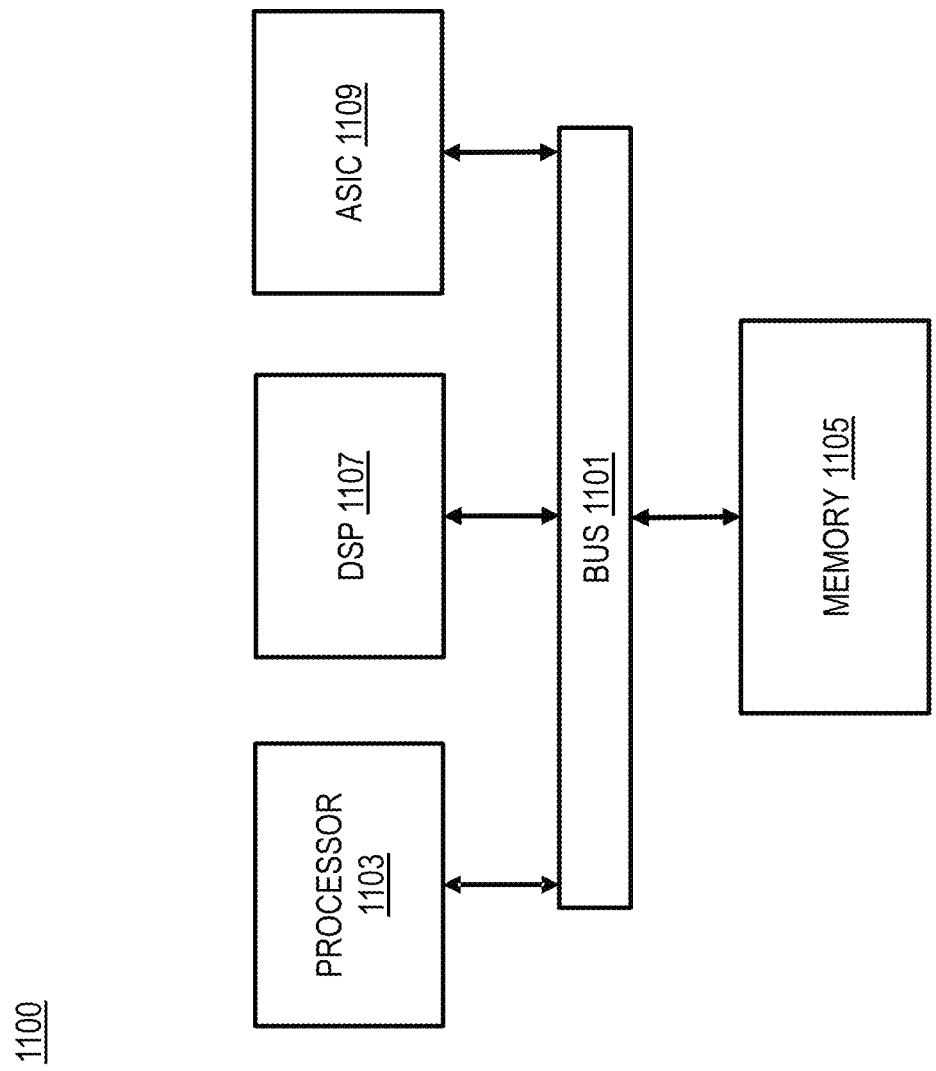
FIG. 11 is a diagram of a chip set that can be used to implement an embodiment.

FIG. 7 is a flowchart of a process for lane width estimation from incomplete lane marking detections of a road lane, according to example embodiment(s). In various embodiments, the mapping platform 101 and/or any of the modules 601-609 may perform one or more portions of the process 700 and may be implemented in, for instance, a chip set including a processor and a memory as shown in FIG. 11. As such, the mapping platform 101 and/or any of the modules 601-609 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In one embodiment, for example, in step 701, the data processing module 601 can generate one or more perpendicular lines (e.g., the perpendicular lines 411*a*, 411*b*, 411*c* in FIG. 4B) respectively from location centers (e.g., the location center 403*c*) of one or more first lane marking detections (e.g., the singular lane marking detection 401*c*). For instance, a respective lane marking detection (e.g., the singular lane marking detection 401*c*) can represent at least a portion of a boundary of the road lane (e.g., the road link segment 405) as a line delimited by two location data points in accordance with one or more detections by at least one sensor device (e.g., the sensor 106 of the UE 105, the sensor 104 of the vehicle 103, etc. in FIG. 1) onboard at least one vehicle (e.g., the vehicle 103 in FIG. 1). For instance, each of the one or more perpendicular lines e.g., the perpendicular lines 411*a*, 411*b*, 411*c*) can be perpendicular to a respective one of the one or more first lane marking detections, a respective one of the one or more second lane marking detections (e.g., the singular lane marking detections 401*a*, 401*c*, 401*d*), or a combination thereof.

In one embodiment, the one or more first lane marking detections and the one or more second lane marking detections can take a form of singular lane marking detections (e.g., portions of lane marking detections 301*a*-301*h* in FIG. 3A, the singular lane marking detections 401*a*-401*d* in FIG. 4B, etc.) that have been generated from continuous lane marking detections (e.g., the lane marking detections 301*a*-301*h*). Each respective continuous lane marking detection can comprise an ordered set of location data points (e.g., the location points 303) representing one or more lane markings of the road lane (e.g., of the road link segment 305), and each respective singular lane marking detection can comprise only two consecutive location data points from a respective ordered set of location points included in a respective continuous lane marking detection.

In one embodiment, in step 703, the data processing module 601 can identify the one or more second lane marking detections (e.g., the singular lane marking detections 401a, 401d) that each respectively intersect one of the one or more perpendicular lines (e.g., the perpendicular lines 411a, 411d).

In one embodiment, in step 705, the estimating module 607 can select one or more candidate lane widths based on one or more respective distances (e.g., the lengths of perpendicular lines 411a, 411d in FIG. 4B) from the location centers (e.g., the location center 403c) to the one or more second lane marking detections (e.g., the singular lane marking detections 401a, 401d).

In one embodiment, in step 707, the estimating module 607 can determine an estimated lane width of the road lane (e.g., on the road link segment 305) based on the one or more candidate lane widths (e.g., the lengths of perpendicular lines 411a, 411d in FIG. 4B). For instance, the filtering module 603 can filter the one or more candidate lane widths based on a lane width specification threshold, such that the estimating module 607 can determine the estimated lane width based on the filtered one or more candidate lane widths. For example, the estimated lane width specification threshold (e.g., the lane width in a range of 2.6 m-4.6 m for a multi-lane road) can be based on a road specification standard (e.g., the Standard Specifications for Construction of Roads and Bridges on Federal Highway Projects). As another instance, the estimating module 607 can increase the estimated lane width specification threshold by a designated value based on determining that the road lane is associated with a single-lane road (e.g., the maximum lane width for a single-lane road increased to a larger value (e.g., 5.5 m) to allow more space for median).

In another embodiment, the clustering module 605 can cluster the one or more first lane marking detections, the one or more second lane marking detections, or a combination thereof (e.g., the singular lane marking detections 401a-401e in FIG. 4A) into two or more clusters (e.g., the clusters 409a-409d) based on respective distances (e.g., the lengths of perpendicular lines 407a-407e) to a map-matched road link segment (e.g., the road link segment 405). For instance, at least one cluster (e.g., the cluster 409a) can represent a first lane marking row, and at least one other cluster (e.g., the cluster 409b) can represent at least one second lane marking row. In addition, the one or more first lane marking detections can be associated with the first lane marking row, and the one or more second lane marking detections can be associated with the at least one second lane marking row.

In another embodiment, the filtering module 603 can determine that two of the one or more candidate lane widths (e.g., the candidate lane widths 505a, 505b in FIG. 5) are duplicate candidates, and filter one of the duplicate candidates (e.g., the candidate lane width 505a) based on respective lengths of respective lane marking detections (e.g., the singular lane marking detections 501a, 501b) associated with the duplicate candidates. For instance, the shorter lane marking length L of the singular lane marking detection 501b is assigned as the lane width weight for estimating the most probable lane width in Stage 521. The estimating module 607 can then determine the estimated lane width based on the filtered one or more candidate lane widths.

In another embodiment, the estimating module 607 can determine the estimated lane width based on an average or a median of the one or more candidate lane widths. In one embodiment, the estimating module 607 can weight the average or the median based on a respective length of the one or more second lane marking detections. In yet another embodiment, the estimating module 607 can determine the estimated lane width based on a minimum or a maximum of the one or more candidate lane widths.

In one example embodiment, based on the lane width estimation performed according to the various example embodiments described herein, the output module 609 can re-construct a representation of the lane marking on each road link segment. In one example embodiment, the output module 609 can store the reconstructed representation of the lane marking in the geographic database 115 or equivalent map data or otherwise provide the representation of the lane marking, orientation estimation, location estimation, or a combination thereof as an output.

It is contemplated that the output comprising the representation of the lane marking with estimated lane width data can be provided for use by any location-based application or service to perform a corresponding function or action based on the output. For example, any service, application, or platform (e.g., mapping platform 101, services platform 119, services 121, content providers 123, application 107, etc.) can receive or otherwise access the output of the mapping platform 101. The service, application, or function processes the newly reconstructed representation of the lane marking to perform one or more location-based functions. In one example embodiment, the function includes autonomous driving based on lane markings.

Figure 8:
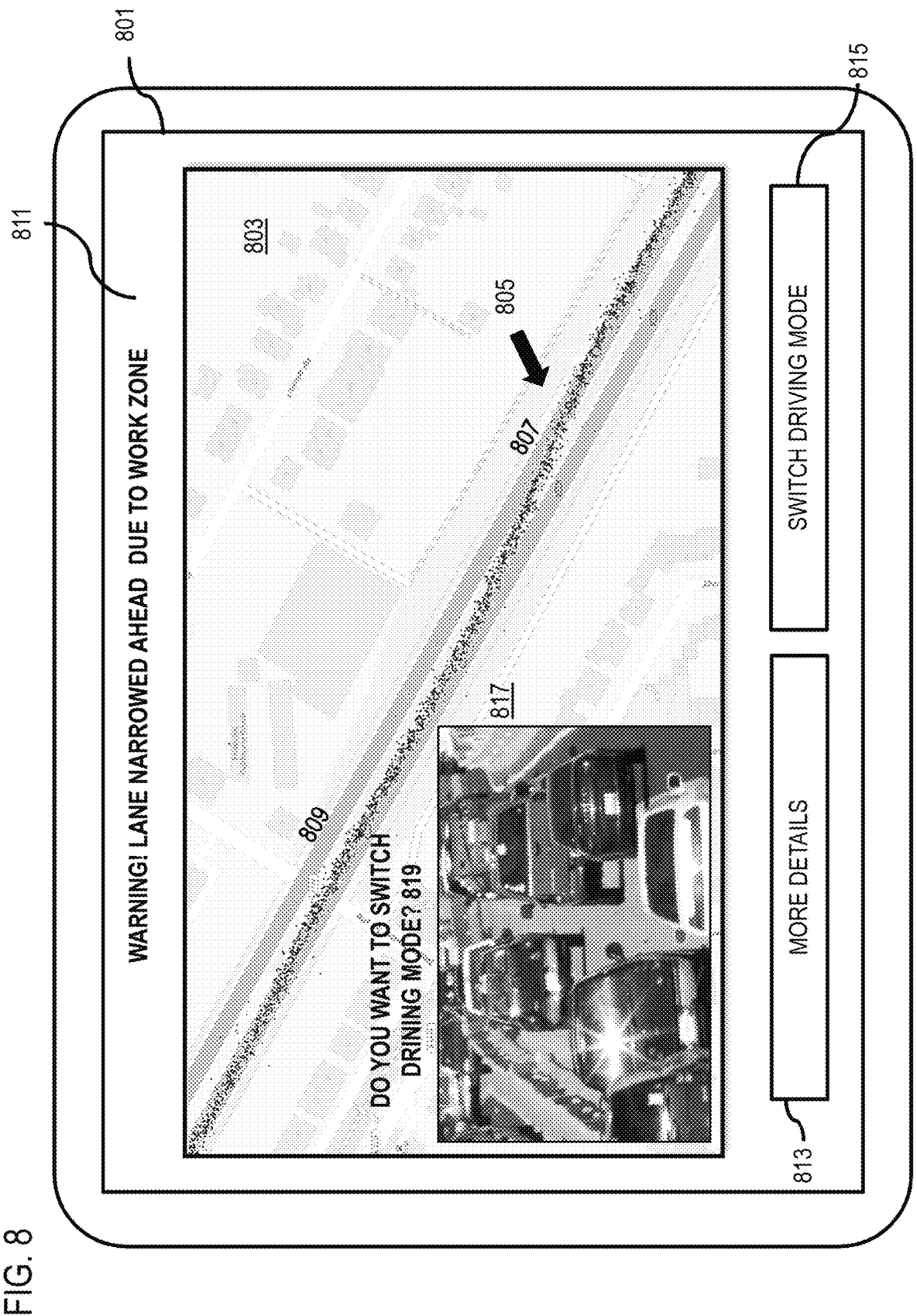
FIG. 8 is a diagram of an example user interface associated with an estimated lane width, according to example embodiment(s)

FIG. 8 is a diagram of an example user interface associated with an estimated lane width, according to example embodiment(s). The user interface 801 in FIG. 8 (e.g., a navigation application 107) is generated for a UE 105 (e.g., a mobile device, an embedded navigation system, a client terminal, etc.). The user interface 801 in FIG. 8 shows a map 803, an arrow 805 pointing towards a work zone 807 cased a narrowed lane width that is estimated as discussed on a road 809 in the map 803, and an alert 811: "Warning! Lane narrowed ahead due to work zone." The user interface 801 also shows a "More Details" button 813 and a "Switch Driving Mode" button 815. For examples, a user can interact with the user interface via one or more physical interactions (e.g., a touch, a tap, a gesture, typing, etc.), one or more voice commands (e.g., "verify lane shift," "flag construction zone," etc.), or a combination thereof.

When the user selects the "More Details" button 813, the user interface 801 shows a live traffic image 817 and an alert 819: "Do you want to switch driving mode?" This is particularly true in the case of a user that is a rider in an autonomous vehicle. It is contemplated that the system 100 can determine or detect one or more actions by a user (e.g., an eye gaze) and automatically detect user selection of switch driving mode. For instance, an experienced driver may want to take over and drive manually via a very narrow lane. As another example, a new driver would prefer autonomous driving via a very narrow lane.

Another use case includes identifying a lane width change or error of the geographic database 115. In this use case, the lane marking representation generated from sensor data captured by a mapping vehicle (e.g., a vehicle 103 with high accuracy location sensors) is compared against existing map data of the geographic database 115 to identify potential discrepancies and updated accordingly. This potential lane width error can then be marked and presented by manual review, verification, additional map data collection, etc.

These example use cases are provided by way of illustration and not as limitations. Other examples of non-limiting examples uses cases for using the output of the mapping platform 101 include, but is not limited to, providing a route for navigation (e.g., via a user interface), route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

Returning to FIG. 1, in one embodiment, the mapping platform 101 has connectivity over the communication network 117 to the services platform 119 that provides one or more services 121 (e.g., probe and/or sensor data collection services, and/or any other location-based/navigation services). By way of example, the services 121 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 119 uses the output (e.g., lane marking representations, lane marking orientation estimations, lane marking location estimations, etc.) of the mapping platform 101 to provide services such as navigation, mapping, other location-based services, etc.

In one embodiment, the mapping platform 101 may be a platform with multiple interconnected components. The mapping platform 101 may include multiple servers, intelligent networking devices, computing devices, components, and corresponding software for providing parametric representations of lane lines. In addition, it is noted that the mapping platform 101 may be a separate entity of the system 100, a part of the services platform 119, a part of the one or more services 121, or included within the vehicles 103 (e.g., an embedded navigation system).

In one embodiment, content providers 123 may provide content or data (e.g., including probe data, sensor data, etc.) to the mapping platform 101, the UEs 105, the applications 107, the geographic database 115, the services platform 119, the services 121, and the vehicles 103. The content provided may be any type of content, such as map content, textual content, audio content, video content, image content, etc. In one embodiment, the content providers 123 may provide content that may aid in lane width estimation from incomplete lane marking detections of a road lane. In one embodiment, the content providers 123 may also store content associated with the mapping platform 101, the geographic database 115, the services platform 119, the services 121, and/or the vehicles 103. In another embodiment, the content providers 123 may manage access to a central repository of data, and offer a consistent, standard interface to data, such as a repository of the geographic database 115.

By way of example, the UEs 105 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.). In one embodiment, a UE 105 may be associated with a vehicle 103 (e.g., a mobile device) or be a component part of the vehicle 103 (e.g., an embedded navigation system). In one embodiment, the UEs 105 may include the mapping platform 101 to provide lane-level mapping/routing based on route identification information determined from unordered line data.

In one embodiment, as mentioned above, the vehicles 103, for instance, are part of a system for collecting image data and/or other sensor data (e.g., comprising line data) for lane marking reconstruction. The image data and/or lane marking detections 109 generated from image data can be reported from the vehicles 103 in real-time, in batches, continuously, or at any other frequency requested by the system 100 over, for instance, the communication network 117 for processing by the mapping platform 101. The image data and/or lane marking detections 109 also can be map-matched to specific road link segments stored in the geographic database 115 according to the embodiments described herein.

In one embodiment, the vehicles 103 and/or UEs 105 are configured with various sensors for generating or collecting lane marking detections 109, image data, probe data, sensor data, related geographic/map data, etc. In one embodiment, the sensed data represents sensor data associated with a geographic location or coordinates at which the sensor data was collected. By way of example, the vehicle sensors may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travel through road segments of a road network.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 103 along a path of travel (e.g., while on a hill or a cliff), moisture sensors, pressure sensors, etc. In a further example embodiment, sensors about the perimeter of the vehicle 103 may detect the relative distance of the vehicle 103 from a physical divider, a lane line of a link or roadway, any other lane marking of the road,), vehicle paths, the presence of other vehicles, pedestrians, traffic lights, potholes and any other objects, or a combination thereof. In one scenario, the vehicle sensors may detect weather data, traffic information, or a combination thereof. In one embodiment, the vehicles 103 may include GPS or other satellite-based receivers to obtain geographic coordinates from satellites 113 for determining current location and time. Further, the location can be determined by visual odometry, triangulation systems such as A-GPS, Cell of Origin, or other location extrapolation technologies.

In one embodiment, the UEs 105 may also be configured with various sensors (not shown for illustrative convenience) for acquiring and/or generating probe data and/or sensor data associated with a vehicle 103, a driver, other vehicles, conditions regarding the driving environment or roadway, etc. For example, such sensors may be used as GPS receivers for interacting with the one or more satellites 113 to determine and track the current speed, position, and location of a vehicle 103 travelling along a link or roadway. In addition, the sensors may gather tilt data (e.g., a degree of incline or decline of the vehicle during travel), motion data, light data, sound data, image data, weather data, temporal data and other data associated with the vehicles 103 and/or UEs 105. Still further, the sensors may detect local or transient network and/or wireless signals, such as those transmitted by nearby devices during navigation of a vehicle along a roadway (Li-Fi, near field communication (NFC)) etc.

It is noted therefore that the above-described data may be transmitted via communication network 117 as lane marking detections 109 or associated sensor data according to any known wireless communication protocols. For example, each UE 105, application 107, user, and/or vehicle 103 may be assigned a unique probe identifier (probe ID) for use in reporting or transmitting said lane marking detections 109 and/or associated sensor data collected by the vehicles 103 and/or UEs 105.

In one embodiment, the mapping platform 101 retrieves aggregated lane marking detections 109 and/or associated sensor data gathered and/or generated by the vehicle sensors and/or the UE 105 resulting from the travel of the UEs 105 and/or vehicles 103 on a road segment of a road network. In one instance, the geographic database 115 stores a plurality of lane marking detections 09 and/or associated sensor data generated by different vehicle sensors, UEs 105, applications 107, vehicles 103, etc. over a period while traveling in a monitored area.

In one embodiment, the communication network 117 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, mapping platform 101, UEs 105, applications 107, services platform 119, services 121, and/or content providers 123 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
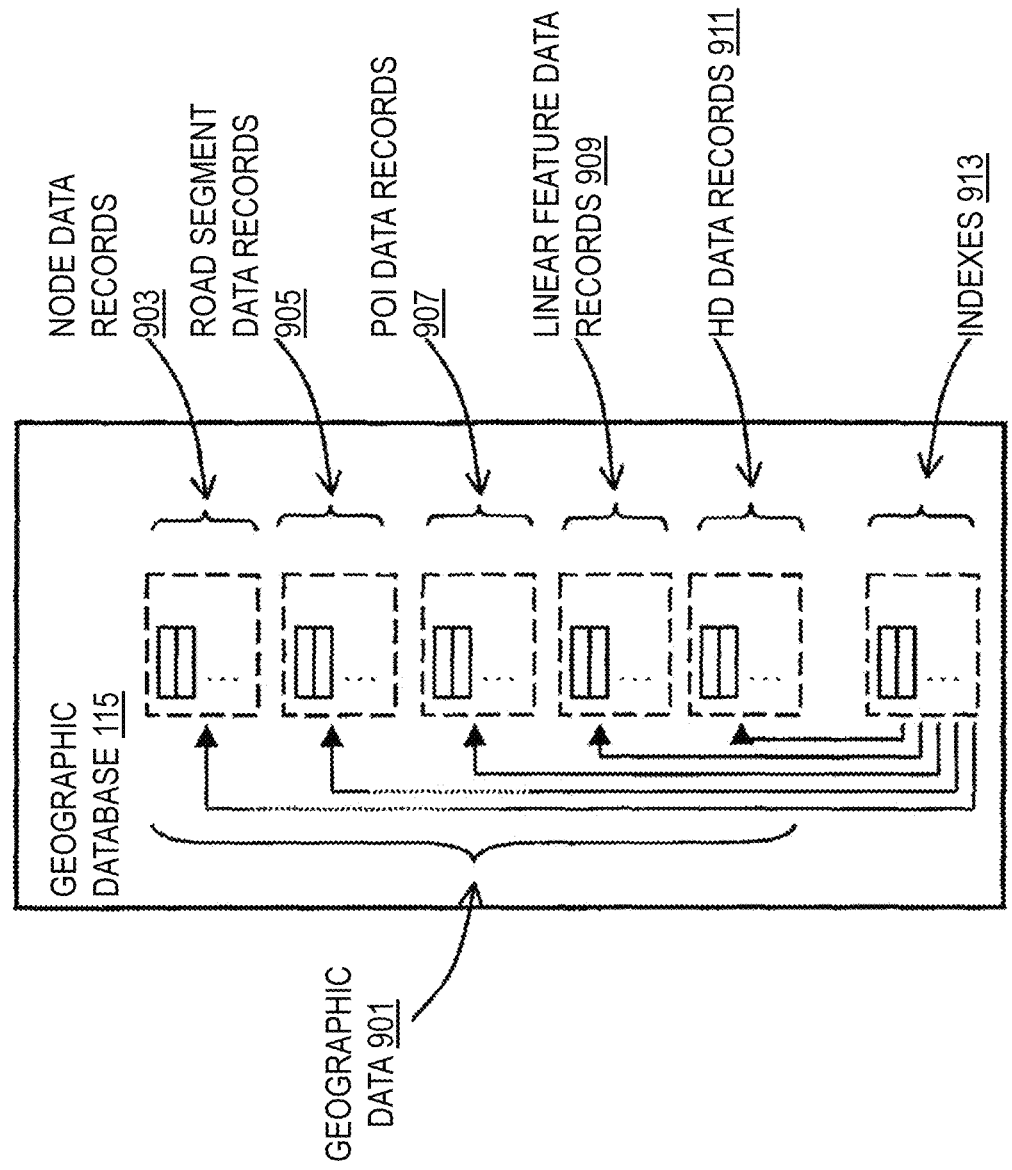
FIG. 9 is a diagram of a geographic database, according to example embodiment(s)

FIG. 9 is a diagram of a geographic database (such as the database 115), according to example embodiment(s). In one embodiment, the geographic database 115 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on LiDAR or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alert a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 903, road segment or link data records 905, POI data records 907, lane marking data records 909, HD mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 115. In one embodiment, the indexes 913 may be used to quickly locate data without having to search every row in the geographic database 115 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points (such as representing intersections, respectively) corresponding to the respective links or segments of the road segment data records 905. The road link data records 905 and the node data records 903 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 907. The geographic database 115 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 115 can also include lane marking data records 909 for storing lane marking detections, lane marking orientations, lane marking locations, estimated lane width data, constructed lane marking representations, and/or any other data generated or used by the system 100 according to the various embodiments described herein. By way of example, the lane marking data records 909 can be associated with one or more of the node records 903, road segment records 905, and/or POI data records 907 to support autonomous driving or other location-based applications based on the features stored therein. In this way, the lane marking data records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 123 in association with the services platform 119 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 103 and/or UEs 105) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for reconstructing road lane markings may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
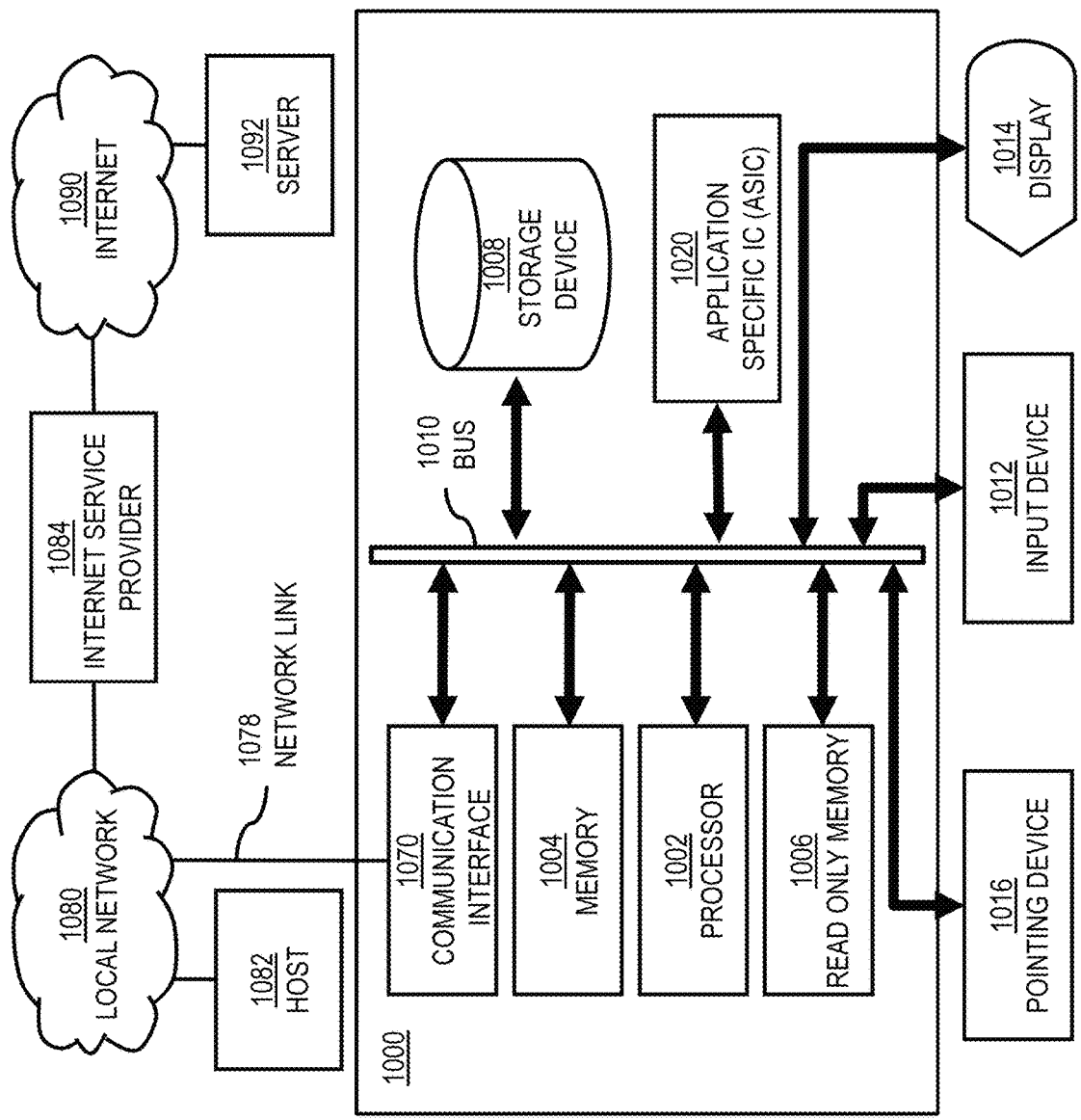
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to reconstruct road lane markings as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to reconstructing road lane markings. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for reconstructing road lane markings. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, which is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, which persists even when the computer system 1000 is turned off or otherwise loses power.

Information, including instructions for reconstructing road lane markings, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, which carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 117 for reconstructing road lane markings.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to reconstruct road lane markings as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to reconstruct road lane markings. The memory 1105 also stores the data associated with or generated by the execution of the inventive steps.

Figure 12:
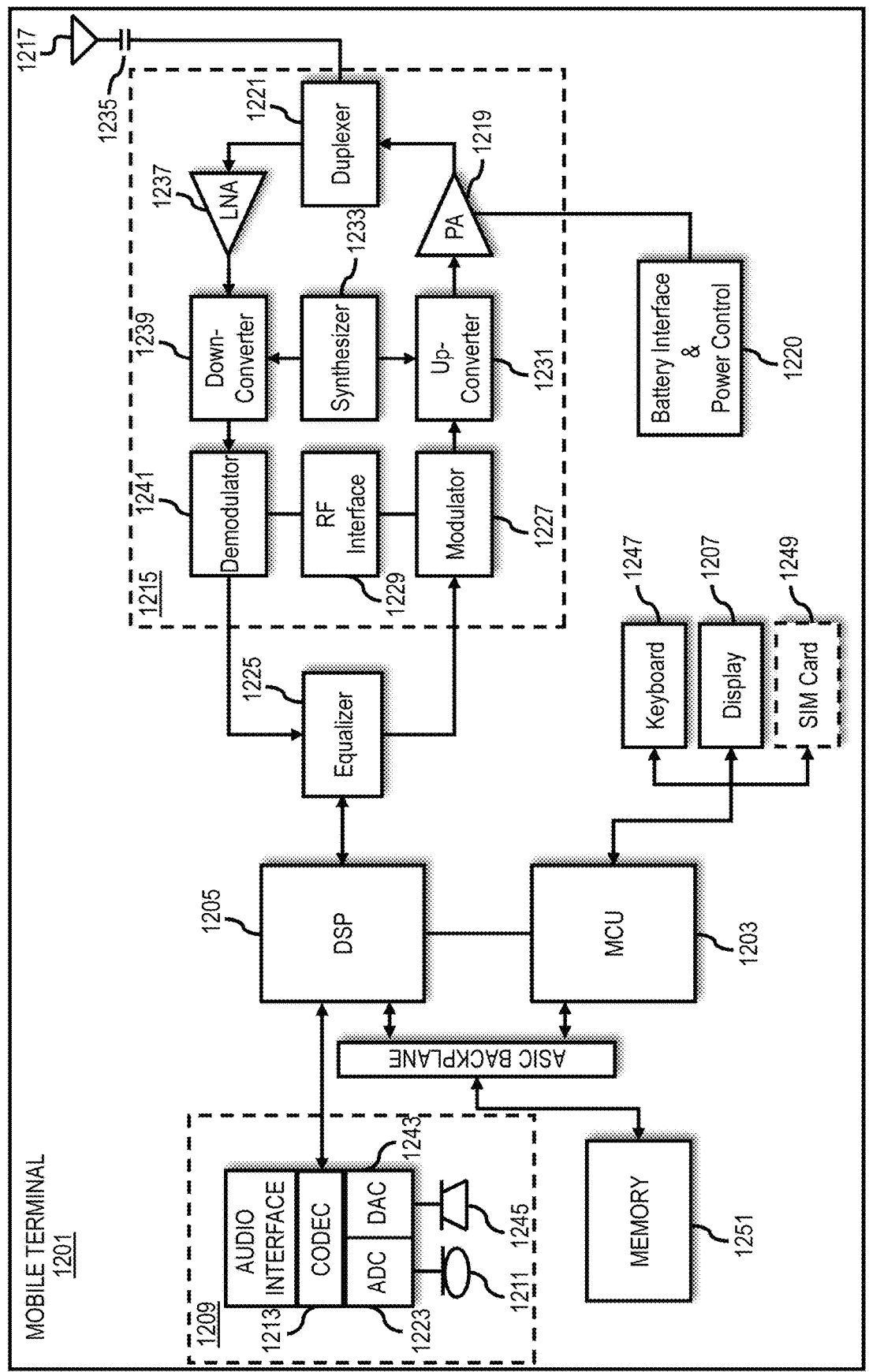
FIG. 12 is a diagram of a mobile terminal (e.g., handset or vehicle or part thereof) that can be used to implement an embodiment.

FIG. 12 is a diagram of exemplary components of a mobile terminal (e.g., handset) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to reconstruct road lane markings. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for lane width estimation from incomplete lane marking detections of a road lane, the method comprising:
    generating, by one or more processors, one or more perpendicular lines respectively from location centers of one or more first lane marking detections, wherein a respective lane marking detection represents at least a portion of a boundary of the road lane as a line delimited by two location data points in accordance with one or more detections by at least one sensor device onboard at least one vehicle;
    identifying, by the one or more processors, one or more second lane marking detections that each respectively intersect one of the one or more perpendicular lines, wherein the one or more first lane marking detections and the one or more second lane marking detections take a form of singular lane marking detections that have been generated from continuous lane marking detections, wherein each respective continuous lane marking detection comprises an ordered set of location data points representing one or more lane markings of the road lane, and wherein each respective singular lane marking detection comprises only two consecutive location data points from a respective ordered set of location points included in a respective continuous lane marking detection;
    selecting, by the one or more processors, one or more candidate lane widths based on one or more respective distances from the location centers to the one or more second lane marking detections; and
    determining, by the one or more processors, an estimated lane width of the road lane based on the one or more candidate lane widths.

2. The method of claim 1, further comprising:
    filtering the one or more candidate lane widths based on a lane width specification threshold,
    wherein the estimated lane width is determined based on the filtered one or more candidate lane widths.

3. The method of claim 2, wherein the estimated lane width specification threshold is based on a road specification standard.

4. The method of claim 2, further comprising:
    increasing the estimated lane width specification threshold by a designated value based on determining that the road lane is associated with a single-lane road.

5. The method of claim 1, further comprising:
    determining that two of the one or more candidate lane widths are duplicate candidates; and
    filtering one of the duplicate candidates based on respective lengths of respective lane marking detections associated with the duplicate candidates,
    wherein the estimated lane width is determined based on the filtered one or more candidate lane widths.

6. The method of claim 1, wherein the estimated lane width is determined based on an average or a median of the one or more candidate lane widths.

7. The method of claim 6, wherein the average or the median is weighted based on a respective length of the one or more second lane marking detections.

8. The method of claim 1, wherein the estimated lane width is determined based on a minimum or a maximum of the one or more candidate lane widths.

9. The method of claim 1, further comprising:
    clustering the one or more first lane marking detections, the one or more second lane marking detections, or a combination thereof into two or more clusters based on respective distances to a map-matched road link segment,
    wherein at least one cluster represents a first lane marking row, and
    wherein at least one other cluster represents at least one second lane marking row.

10. The method of claim 9, wherein the one or more first lane marking detections are associated with the first lane marking row, and wherein the one or more second lane marking detections are associated with the at least one second lane marking row.

11. The method of claim 1, wherein each of the one or more perpendicular lines is perpendicular to a respective one of the one or more first lane marking detections, a respective one of the one or more second lane marking detections, or a combination thereof.

12. An apparatus for lane width estimation from incomplete lane marking detections of a road lane, comprising:
    at least one processor; and
    at least one memory including computer program code for one or more programs,
    the at least one memory and the computer program code configured to, within the at least one processor, cause the apparatus to perform at least the following,
    generate one or more perpendicular lines respectively from location centers of one or more first lane marking detections, wherein a respective lane marking detection represents at least a portion of a boundary of the road lane as a line delimited by two location data points in accordance with one or more detections by at least one sensor device onboard at least one vehicle;
    identify one or more second lane marking detections that each respectively intersect one of the one or more perpendicular lines, wherein the one or more first lane marking detections and the one or more second lane marking detections take a form of singular lane marking detections that have been generated from continuous lane marking detections, wherein each respective continuous lane marking detection comprises an ordered set of location data points representing one or more lane markings of the road lane, and wherein each respective singular lane marking detection comprises only two consecutive location data points from a respective ordered set of location points included in a respective continuous lane marking detection;
    select one or more candidate lane widths based on one or more respective distances from the location centers to the one or more second lane marking detections; and determine an estimated lane width of the road lane based on the one or more candidate lane widths.

13. The apparatus of claim 12, wherein the apparatus is further caused to:
filter the one or more candidate lane widths based on a lane width specification threshold,
wherein the estimated lane width is determined based on the filtered one or more candidate lane widths.

14. The apparatus of claim 13, wherein the estimated lane width specification threshold is based on a road specification standard.

15. The apparatus of claim 12, wherein the apparatus is further caused to:
determine that two of the one or more candidate lane widths are duplicate candidates; and
filter one of the duplicate candidates based on respective lengths of respective lane marking detections associated with the duplicate candidates,
wherein the estimated lane width is determined based on the filtered one or more candidate lane widths.

16. A non-transitory computer-readable storage medium for lane width estimation from incomplete lane marking detections of a road lane, carrying one or more sequences of one or more instructions which, when executed by one or more processors, cause an apparatus to perform:
generating one or more perpendicular lines respectively from location centers of one or more first lane marking detections, wherein a respective lane marking detection represents at least a portion of a boundary of the road lane as a line delimited by two location data points in accordance with one or more detections by at least one sensor device onboard at least one vehicle;
identifying one or more second lane marking detections that each respectively intersect one of the one or more perpendicular lines, wherein the one or more first lane marking detections and the one or more second lane marking detections take a form of singular lane marking detections that have been generated from continuous lane marking detections, wherein each respective continuous lane marking detection comprises an ordered set of location data points representing one or more lane markings of the road lane, and wherein each respective singular lane marking detection comprises only two consecutive location data points from a respective ordered set of location points included in a respective continuous lane marking detection;
selecting one or more candidate lane widths based on one or more respective distances from the location centers to the one or more second lane marking detections; and
determining an estimated lane width of the road lane based on the one or more candidate lane widths.

17. The non-transitory computer-readable storage medium of claim 16, wherein the apparatus is caused to further perform:
filtering the one or more candidate lane widths based on a lane width specification threshold,
wherein the estimated lane width is determined based on the filtered one or more candidate lane widths.

* * * * *